(12) United States Patent
Miller et al.

(10) Patent No.: US 8,406,800 B2
(45) Date of Patent: Mar. 26, 2013

(54) METHOD AND DEVICE FOR ESTABLISHING AN INTER-RADIO FREQUENCY SUBSYSTEM INTERFACE (ISSI) UNIT-TO-UNIT CALL

(75) Inventors: Trent J. Miller, West Chicago, IL (US); Rod N. Averbuch, Chicago, IL (US); Gerald R. Drobka, Naperville, IL (US); Peter M. Drozt, Prairie Grove, IL (US); Sikendar Fidai, South Barrington, IL (US); Michael F. Korus, Eden Prairie, MN (US); Todd A. Leigh, East Lansing, MI (US); Donald G. Newberg, Hoffman Estates, IL (US); Scott J. Pappas, Lake Zurich, IL (US); Brian R. Poe, Cary, IL (US); Steven E. Vanswol, Lombard, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 446 days.

(21) Appl. No.: 12/756,379

(22) Filed: Apr. 8, 2010

(65) Prior Publication Data
US 2011/0250923 A1 Oct. 13, 2011

(51) Int. Cl.
*H04B 7/00* (2006.01)
(52) U.S. Cl. ........................ 455/518; 455/519
(58) Field of Classification Search ........... 455/518–521
See application file for complete search history.

(56) References Cited

U.S. PATENT DOCUMENTS

| | | |
|---|---|---|
| 2008/0181145 A1 | 7/2008 | Chowdhury et al. |
| 2008/0200162 A1 | 8/2008 | Chowdhury et al. |
| 2009/0005100 A1 | 1/2009 | Copeland |
| 2011/0250922 A1 | 10/2011 | Miller et al. |

OTHER PUBLICATIONS

PCT Search Report Dated May 13, 2011 for Counterpart Application.
Tom Hengeveld, et al. "Project 25 ISSI Support for Supplementary Data", Internet Citation, Mar. 20, 2006, pp. 1-35, XP002606152, Retrieved From Internet: URL:ftp//ftp.triaonline.org/tr-8/apic/psawg/06-035%/20Supplementary%20Data%20Architecture.doc.
PCT Search Report Dated Jun. 14, 2011 for U.S. Appl. No. 12/756,355.

*Primary Examiner* — Raymond Dean
(74) *Attorney, Agent, or Firm* — Terri Hughes Smith; Steven A. May (57) ABSTRACT

A method and device enable establishing an inter-radio frequency subsystem interface (ISSI) unit-to-unit call between a calling unit of a calling home radio frequency subsystem (RFSS), and a called unit of a called home RFSS, through a hosted ISSI function (HIF). The method includes processing, at the HIF, a first invite message received from the calling home RFSS, wherein the first invite message includes a first request uniform resource identifier (URI) that designates an alias system unit identification (SU-ID). In response to the first invite message, transmitting, from the HIF to the called home RFSS, a second invite message, including a second request URI that designates a real SU-ID, wherein the HIF acts as the calling home RFSS. The unit-to-unit call is thus established between the calling unit and the called unit through the calling home RFSS, the HIF, and the called home RFSS.

20 Claims, 14 Drawing Sheets

METHOD AND DEVICE FOR ESTABLISHING AN INTER-RADIO FREQUENCY SUBSYSTEM INTERFACE (ISSI) UNIT-TO-UNIT CALL

CROSS REFERENCE TO RELATED APPLICATION

This application is commonly owned by Motorola, Inc. and concurrently filed with the following U.S. patent application: Ser. No. 12/756,355 titled "METHOD AND DEVICE FOR ESTABLISHING AN INTER-RADIO FREQUENCY SUBSYSTEM INTERFACE (ISSI) GROUP CALL," which is incorporated herein by reference in its entirety.

FIELD OF THE DISCLOSURE

The present disclosure relates generally to wireless communication networks, and in particular to establishing an inter-radio frequency subsystem interface (ISSI) unit-to-unit call.

BACKGROUND

For many decades, half duplex two-way radio networks have provided reliable and convenient communications using limited shared radio resources. For example, "walkie-talkie" and citizens band (CB) radio networks have enabled users to maintain direct communication channels with other users over extended periods of time. The push-to-talk (PTT) and "instant on" features of half duplex radio devices provide desirable modes of wireless communication for users such as truckers, construction and industrial site personnel, military personnel, taxi dispatchers, police and fire personnel and numerous others. Many modern communication systems designed for public safety use group communications, which allow two or more participants to exchange voice, video, and other data. A floor control mechanism then dictates which device in the network is permitted to source media at a given time.

The Telecommunications Industry Association (TIA) Project 25 (P25) concerns a set of standards for digital radio communications for use by various emergency response teams. P25 was established to address the need for common digital public safety radio communications standards, including PTT communications standards. The P25 suite of standards involves digital land mobile radio (LMR) services commonly used by police and fire departments, and other public safety organizations. The P25 standards define numerous internet protocol (IP) interfaces. One such P25 interface, ISSI, supports interoperability between P25 systems. The ISSI for PTT was published by the TIA in the TIA-102.BACA-A documents. The ISSI provides network connectivity between P25 networks and enables network administrators to connect to other local, regional, state, or federal networks. A radio frequency subsystem (RFSS) contains a PTT server which is used during a P25 PTT session, and the ISSI enables communications between PTT servers in different RFSSs.

Figure 1:
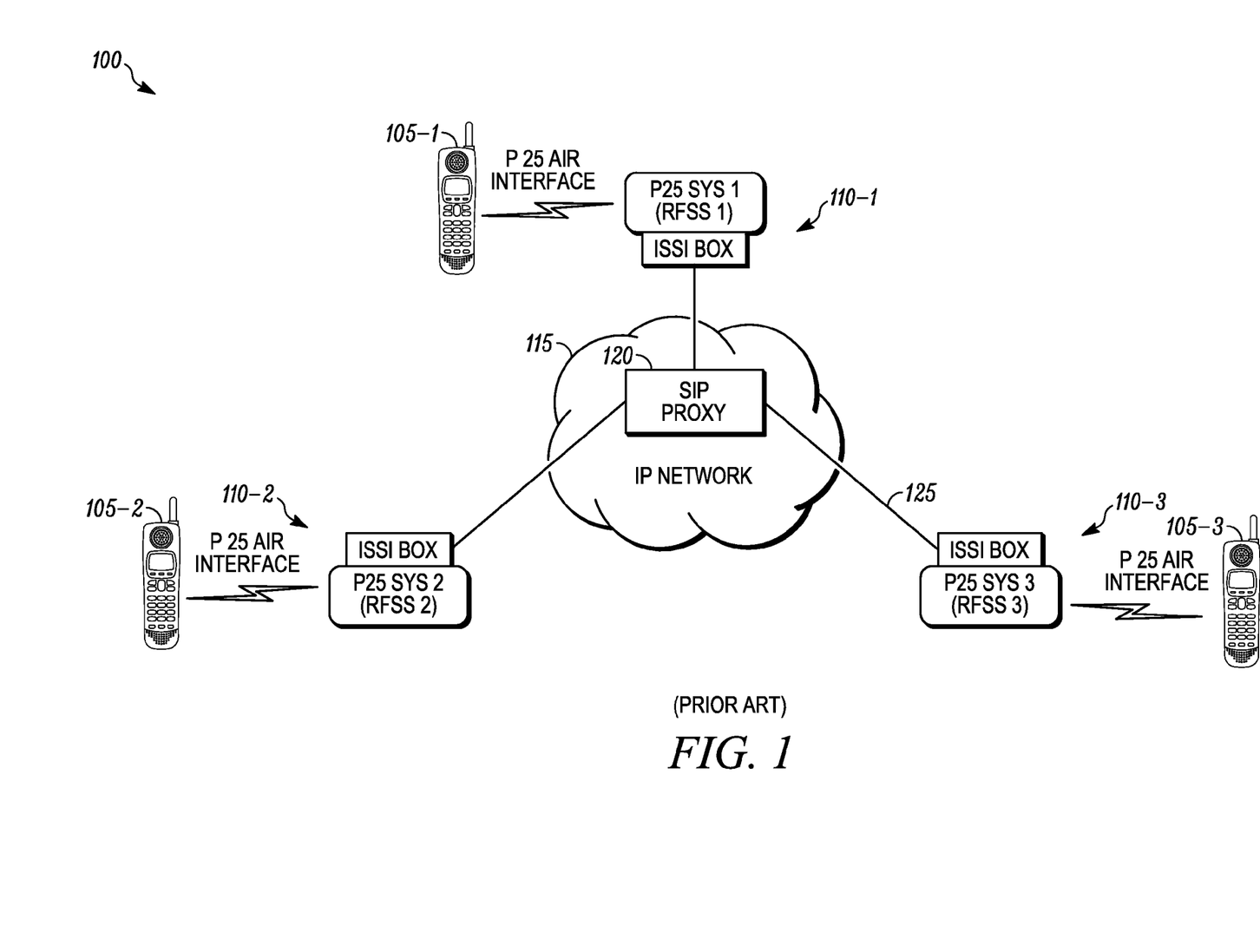
FIG. 1 is a network diagram illustrating elements of a wireless communication network including a hosted ISSI "wheel and spoke" architecture, according to the prior art.

Referring to FIG. 1, a network diagram illustrates elements of a wireless communication network 100 including a hosted ISSI "wheel and spoke" architecture, according to the prior art. The network 100 includes P25 radios 105-$n$ that are in radio frequency (RF) communication with corresponding "home" RF subsystems 110-$n$. For example, the P25 radio 105-1 communicates over a common air interface with its home RFSS 110-1. Multiple P25 radios 105-$n$ can be registered with a RFSS 110-$n$. Each RFSS 110-$n$ is then operatively coupled via an IP network 115 to a simple SIP proxy 120. The SIP proxy 120 does not have a wide area communications network (WACN) or System Identifier (ID) assigned to it directly and the simple SIP proxy 120 merely routes data packets (including voice data and control messaging) between the RFSSs 110-$n$. Thus, for example, if the RFSS1 110-1 seeks to send a message to both the RFSS2 110-2 and the RFSS3 110-3, the RFSS1 110-1 must send two messages explicitly: a first message targeting the RFSS2 110-2 and a second message targeting the RFSS3 110-3.

Figure 2:
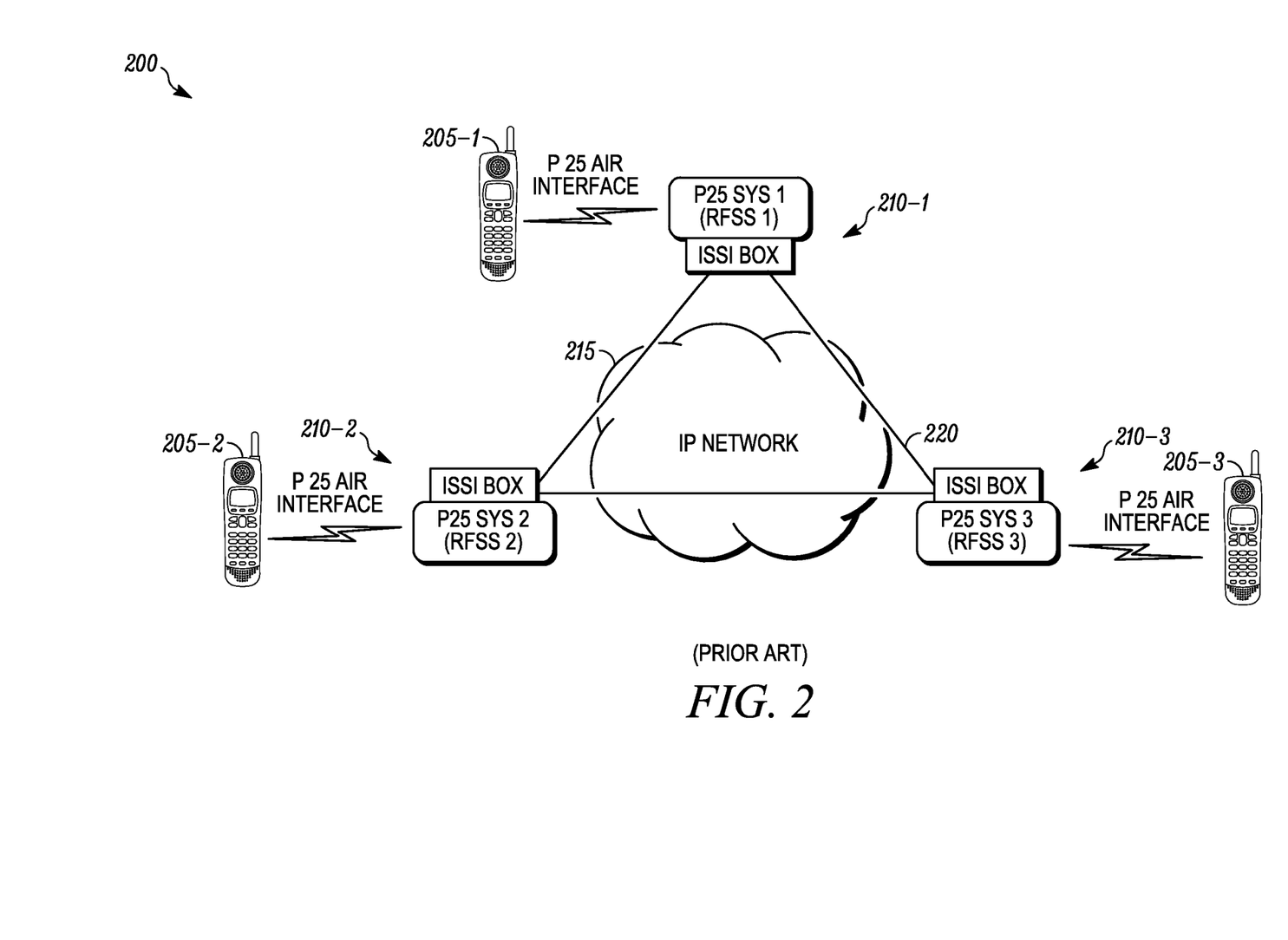
FIG. 2 is a network diagram illustrating elements of a wireless communication network including an agency-based ISSI "point-to-point mesh" architecture, according to the prior art.

Referring to FIG. 2, a network diagram illustrates elements of a wireless communication network 200 including an agency-based ISSI "point-to-point mesh" architecture, according to the prior art. Similar to the network 100 described above, the network 200 includes P25 radios 205-$n$ that are in RF communication with corresponding home RFSSs 210-$n$. For example, the P25 radio 205-1 communicates over an air interface with RFSS 210-1. However, each RFSS 210-$n$ is operatively coupled via an IP network 215 to another RFSS 210-$n$. Further, to interconnect to multiple remote RFSSs 110-$n$, a home RFSS 110-$n$ generally must interface with multiple IP networks, which increases security risks for the home RFSS 110-$n$.

ISSI connections between RFSSs, such as those illustrated by the lines 125 and 220 in FIGS. 1 and 2, respectively, are generally private IP connections, which use wired local area network (LAN) or wide area network (WAN) technologies, or wireless technologies. The ISSI connections are generally made across a common carrier, such as a T1 or multiprotocol label switching (MPLS) carrier.

The prior art ISSI wireless communication networks 100, 200 described above can have difficulties concerning end-user configuration complexity, security, scalability, and interoperability policy enforcement.

In addition, Terrestrial Trunked Radio (TETRA) is a standard of the European Telecommunications Standards Institute (ETSI) that, similar to Project 25, concerns digital LMR services for use primarily by police and fire departments, and other public safety organizations. TETRA is popular in many parts of Europe and Asia and has particular advantages including a long range and high spectral efficiency. Communications between independent TETRA networks can be established using an inter-system interface (ISI) that provides the required bandwidth and efficient inter-system signaling. The ISI also enables other functions such as inter-system mobility management and user authentication. These ISI wireless communication networks, however, can also experience the same difficulties as the ISSI wireless communication networks described above.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 11 is a block diagram illustrating components of a HIF device, according to an embodiment of the present disclosure Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

According to an embodiment of the present disclosure, a method enables establishing an ISSI unit-to-unit call between a calling unit of a calling home RFSS, and a called unit of a called home RFSS, through a HIF. The method includes processing, at the HIF, a first invite message received from the calling home RFSS, The first invite message includes a first request uniform resource identifier (URI) that designates an alias system unit identification (SU-ID). In response to the first invite message, transmitting, from the HIF to the called home RFSS, a second invite message, including a second request URI that designates a real SU-ID. The unit-to-unit call is thus established between the calling unit and the called unit through the calling home RFSS, the HIF, and the called home RFSS.

Embodiments of the present disclosure thus enable a HIF to track mobility at the RFSS level for all roaming subscriber units in a network, and to proxy all session initiation protocol (SIP) signaling and data packets from a single RFSS to all other RFSSs in the network. Network security is also improved by the centralization of call management. The HIF may copy data packets as required so that each RFSS can logically connect to a large number of other RFSSs through the HIF, while only physically maintaining a single ISSI link to the HIF itself. The single ISSI link increases calling capacity at each RFSS because it reduces the processing load at each RFSS. Network security is also improved by the centralization of call management. A data packet can also be an ISSI session/call control packet, floor control/transmission control packet (e.g. a request packet, a grant packet, etc.), or a media packet (e.g. voice, video, etc). In this context, the word "copy" may or may not mean to create an exact copy of the received data packet. For example, the HIF may modify unit addressing information from the received data packet to the packet that is sent by the HIF. As used in this description, the term "real SU-ID" refers to a SU-ID used by a unit's home RFSS and refers directly to physical equipment; whereas the term "alias SU-ID" does not refer directly to physical equipment.

Figure 3:
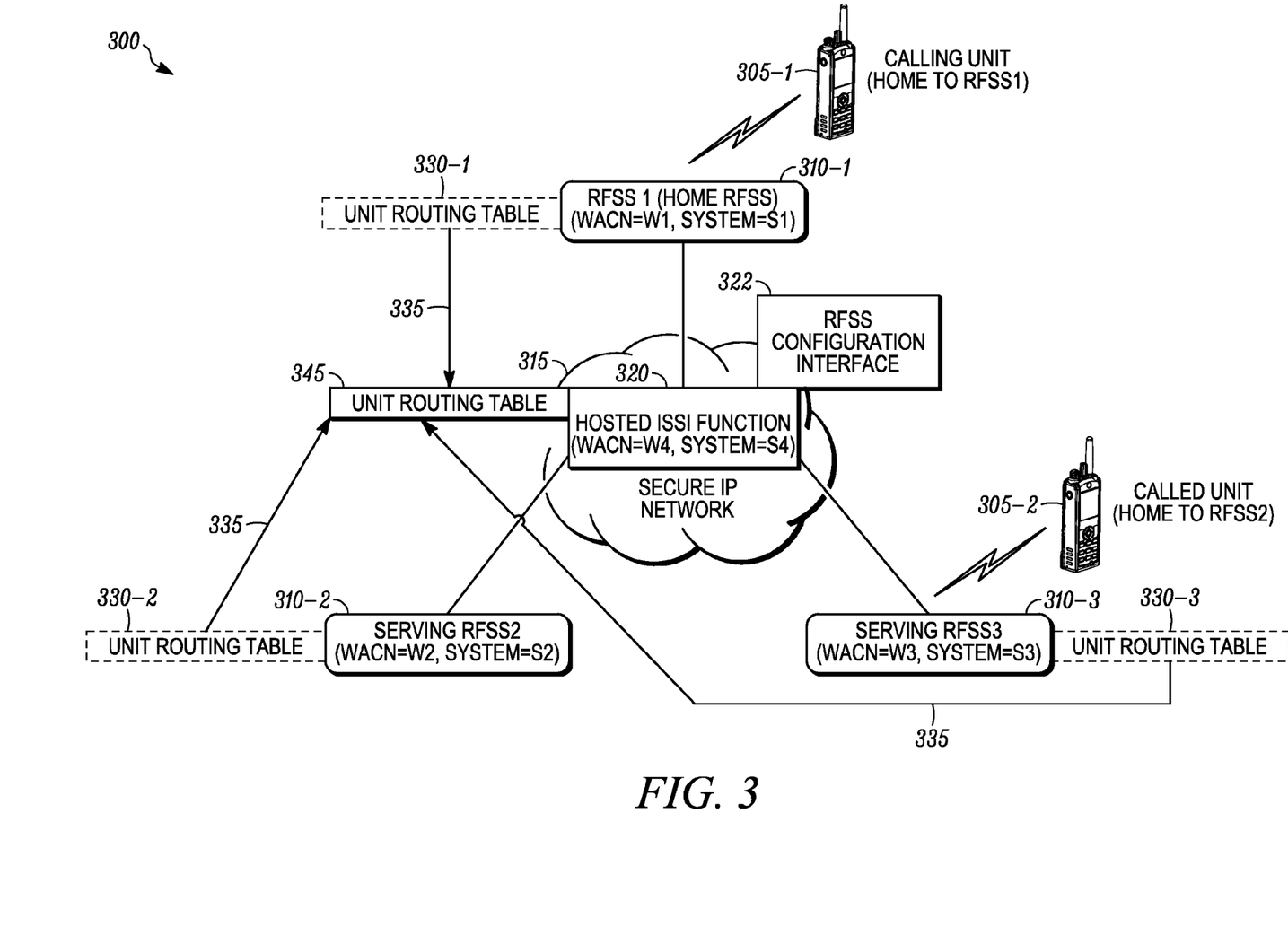
FIG. 3 is a network diagram illustrating elements of a wireless communication network including a hosted ISSI "wheel and spoke" architecture, according to an embodiment of the present disclosure.

Referring to FIG. 3, a network diagram illustrates elements of a wireless communication network 300 including a hosted ISSI "wheel and spoke" architecture, according to an embodiment of the present disclosure. Similar to the prior art network 100, the network 300 includes P25 radio units 305-$n$ that are in RF communication with corresponding home or serving RFSSs 310-$n$. However, unlike in the network 100, in the network 300 a HIF 320 may appear to serving RFSSs as an autonomous RFSS. Also, the HIF 320 may use its own unique WACN and System ID, may use multiple WACNs and System IDs, or may reuse WACNs and System IDs assigned to other RFSSs. Further, data packets received from serving RFSSs may terminate at the HIF 320 before they are replicated to the appropriate receiving RFSSs.

Multiple P25 radio units 305-$n$ may be registered with a RFSS 310-$n$. For example, in FIG. 3, the RFSS1 310-1 is identified as a home RFSS, and the RFSS2 310-2 and the RFSS3 310-3 are identified as serving RFSSs. A serving RFSS may have P25 radio units 305-$n$ that are provisioned to a different home RFSS. For example, consider that a calling unit 305-1 is based with the home RFSS1 310-1, and a called unit 305-2 is based with the home RFSS2 310-2 but is currently roaming and associated with the serving RFSS3 310-3. As will be understood by those having ordinary skill in the art, an RFSS 310-$n$ can be of various types, including a P25 RFSS or a TETRA ISI RFSS.

Each RFSS 310-$n$ may be operatively coupled via an IP network 315 to the HIF 320. Each RFSS 310-$n$ may have a secure, unique configuration interface 322 at the HIF 320, which enables each RFSS 310-$n$ to define with which other RFSSs 310-$n$ a particular RFSS 310-$n$ can communicate. A unit routing table 330-$n$ may also be associated with each RFSS 310-$n$. As shown by the arrows 335, data from each unit routing table 330-$n$ may be maintained in a HIF unit routing table 345.

The HIF 320 may track mobility for all roaming subscriber units, and may proxy all SIP signaling from a single RFSS 310-$n$ to all other RFSSs 310-$n$. The HIF 320 may function as a SIP back to back user agent. To an existing RFSS 310-$n$, the HIF 320 may appear to be just another RFSS 310-$n$, and thus the HIF 320 may enable multiple RFSSs to be represented to another RFSS as a single RFSS. For example, instead of the RFSS1 310-1 requiring separate connections to the other RFSSs 310-n, the RFSS1 310-1 may only need to have a connection with the HIF 320. The HIF 320 thus may serve as a control and media replication engine for ISSI traffic, reducing the traffic load on other RFSSs 310-n in the network 300. Further, the HIF 320 may store called unit registration information, including, but not limited to, the following: home RFSS transport information of a called unit or calling unit (e.g. one or more of IPv4 addresses, IPv6 addresses, port numbers, Gateway addresses, and ISSI link IP/port numbers); an identification of a called home RFSS; system identification; a WACN identification; and a subscriber unit identity.

Figure 4:
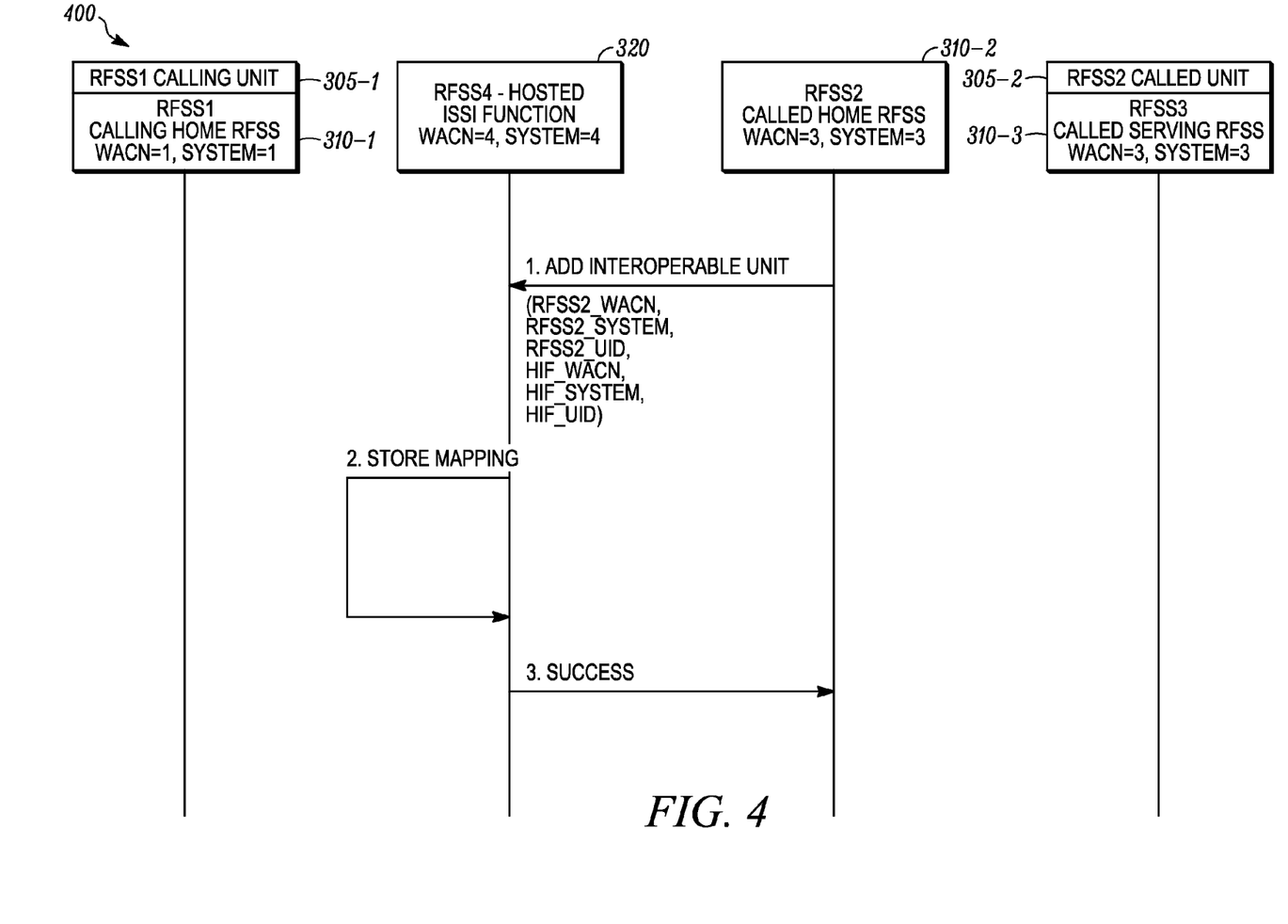
FIG. 4 is a message sequence chart illustrating an exemplary method for establishing an inter-RFSS interface unit to unit call between a calling unit of a calling home RFSS, and a called unit of a called home RFSS, through a hosted ISSI function (HIF), according to an embodiment of the present disclosure.

Referring to FIG. 4, a message sequence chart illustrates an exemplary method 400 for establishing an ISSI unit-to-unit call between the calling unit 305-1 of the RFSS1 310-1 and the called unit 305-2 of the called home RFSS2 310-2 through the HIF 320, according to an embodiment of the present disclosure. Those having ordinary skill in the art will recognize that for purposes of brevity and clarity, the message sequence charts of this disclosure do not illustrate all signalling messages actually used in a particular embodiment, but only those necessary to illustrate features of the present disclosure.

First, consider that a home RFSS administrator for the RFSS2 310-2 may chose to make the called unit 305-2 interoperable, such that the called unit 305-2 may register a serving RFSS 310-n and may be called by units 305-n from other RFSSs 310-n. For example, that may be accomplished by the RFSS2 310-2 transmitting to the HIF 320 an add interoperable unit message 1. Alternatively, making the called unit 305-2 interoperable may be accomplished by other means as well, such as via a web interface, through local provisioning at the HIF 320, or through configuration management. A SU-ID of the RFSS2 310-2 may be optionally mapped at the HIF 320 to an alias unit ID. For example, if the SU-ID is 2.2.123, then an alias SU-ID may be 4.4.789. The alias unit ID avoids having multiple RFSSs 310-n use the same SU-ID. The alias unit ID may be provided by the RFSS3 310-3 or by the HIF 320. In some cases, the SU-ID of the HIF 320 may be identical to the SU-ID of the RFSS2 310-2. Thus, the HIF 320 may share the same WACN and System ID of a "real" RFSS 310-n, at least from the perspective of the other RFSSs 310-n. At arrow 2, the HIF 320 may store the mapping between the real SU-ID of the called unit 305-2 and the alias unit ID. A success message 3 may then be transmitted from the HIF 320 to the RFSS2 310-2.

Figure 5:
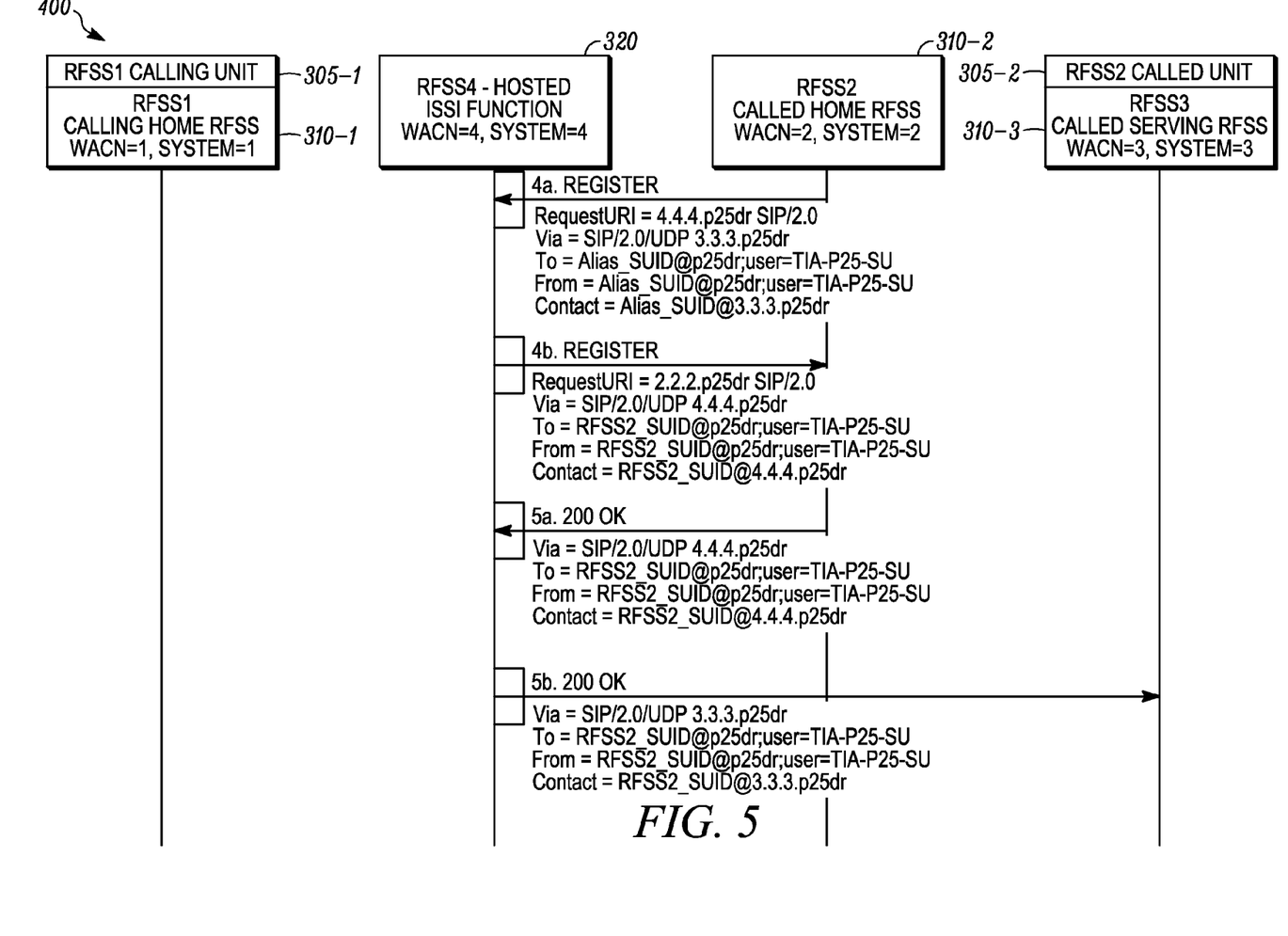
FIG. 5 is a message sequence chart illustrating a continuation from FIG. 4 of the method for establishing an ISSI unit-to-unit call, including registering an interoperable unit in a serving RFSS.

Referring to FIG. 5, a message sequence chart illustrates a continuation from FIG. 4 of the method 400. Consider that the called unit 305-2 may register with the RFSS3 310-3. The RFSS3 310-3 may then determine the home RFSS of the called unit 305-2. Thus, the RFSS3 310-3 may transmit a SIP REGISTER message 4a to the HIF 320. The message 4a may include, among other data, a Request URI address, a Via address, a To address, a From address, and a Contact address. The message 4a may be defined, for example, by the TIA standard "Project 25 (P25): Inter-RF Subsystem Interface Messages and Procedures for Voice Services," TIA-102.BACA-A. The HIF 320 may then change its role and, appear as the serving RFSS 310-3, create and transmit a corresponding SIP REGISTER message 4b, including proxy address data, to the home RFSS2 310-2. A SIP 200 OK message 5a may then be sent from the RFSS2 310-2 to the HIF 320, and a SIP 200 OK message 5b may be sent from the HIF 320 to the serving RFSS3 310-3.

Figure 6A:
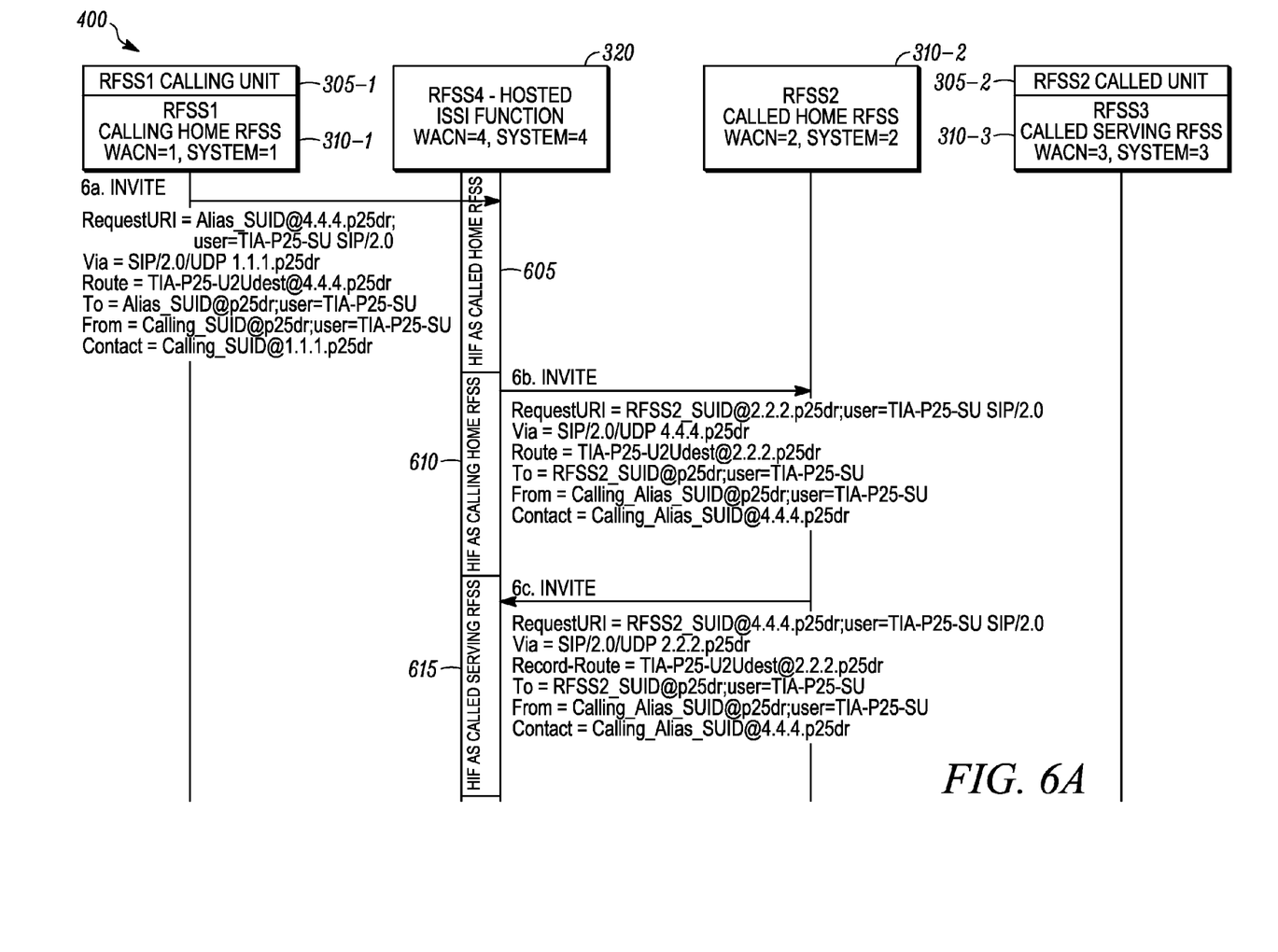
FIGS. 6A and 6B is a message sequence chart illustrating a continuation from FIG. 5 of the method for establishing an ISSI unit-to-unit call, including processing an invite message from a calling unit.
Figure 6B:
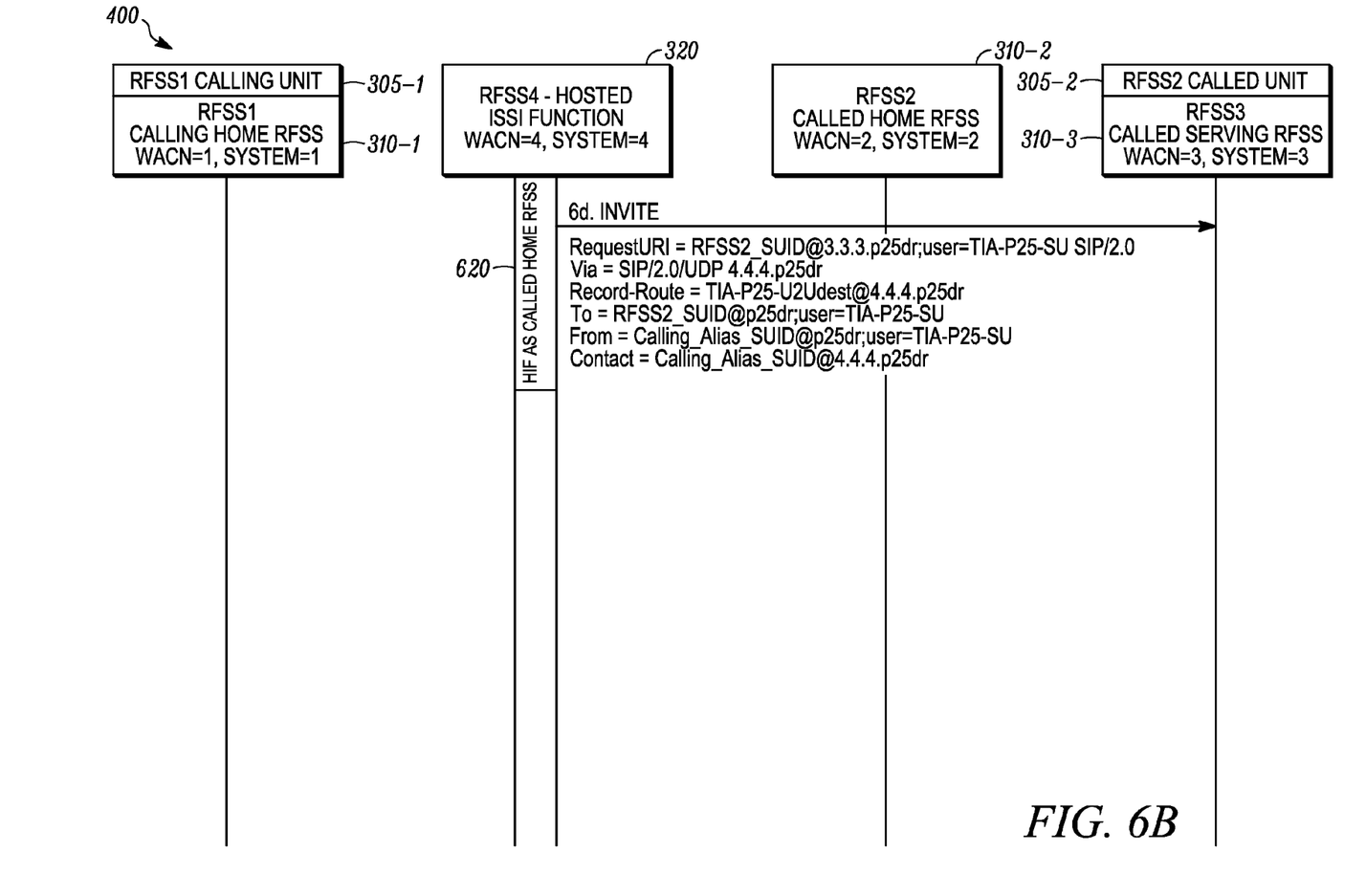

Referring to FIGS. 6A and 6B, a message sequence chart illustrates a continuation from FIG. 5 of the method 400. Consider that the calling unit 305-1 may seek to initiate a unit-to-unit call with the called unit 305-2. First, the RFSS1 310-1 may transmit a SIP INVITE message 6a to the HIF 320. The message 6a may include a Request URI address, a Via address, a Record-route address, a To address, a From address, and a Contact address. Provisional response messages, such as SIP 100 TRYING and SIP 180 RINGING messages, are not shown. Further, throughout all of the figures, header fields not related to the present disclosure are generally omitted from the figures for simplicity, and not all fields in the shown header fields are included.

The HIF 320 may then transmit a corresponding SIP INVITE message 6b to the RFSS2 310-2. The HIF 320 may retrieve the real called SU-ID (i.e. the RFSS2 310-2 SU-ID) from the previous mapping stored by the HIF 320. After the INVITE message 6b is accepted, the RFSS2 310-2 may transmit a corresponding INVITE message 6c to the HIF 320, and the HIF 320 may transmit a corresponding INVITE message 6d to the RFSS3 310-3. As shown by the blocks 605, 610, 615, 620, the HIF 320 may act alternatively in the role of the called home RFSS, calling home RFSS, called serving RFSS, and again as called home RFSS.

Figure 7A:
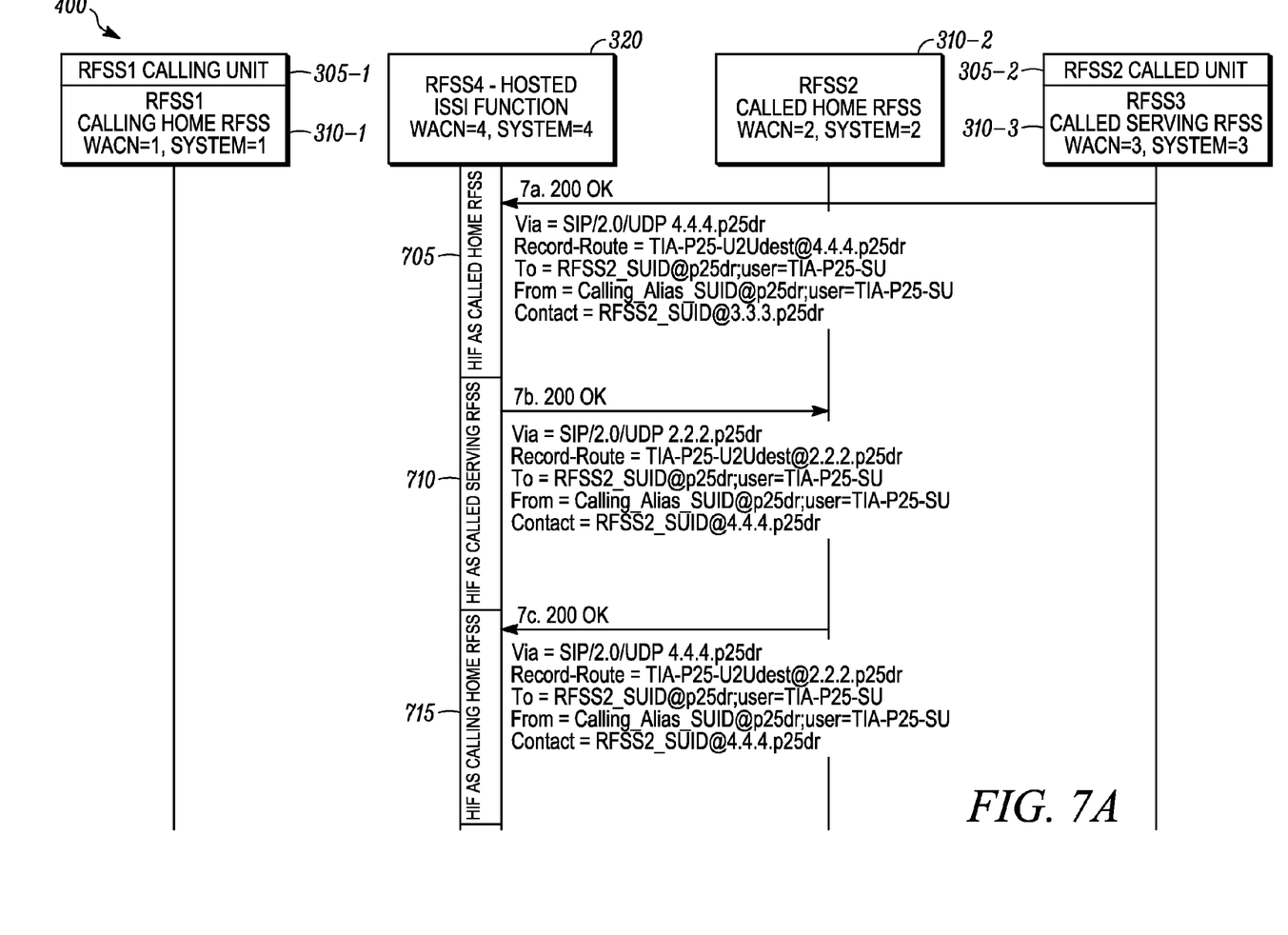
FIGS. 7A and 7B is a message sequence chart illustrating a continuation from FIG. 6B of the method for establishing an ISSI unit-to-unit call, including processing an OK message from a called unit.
Figure 7B:
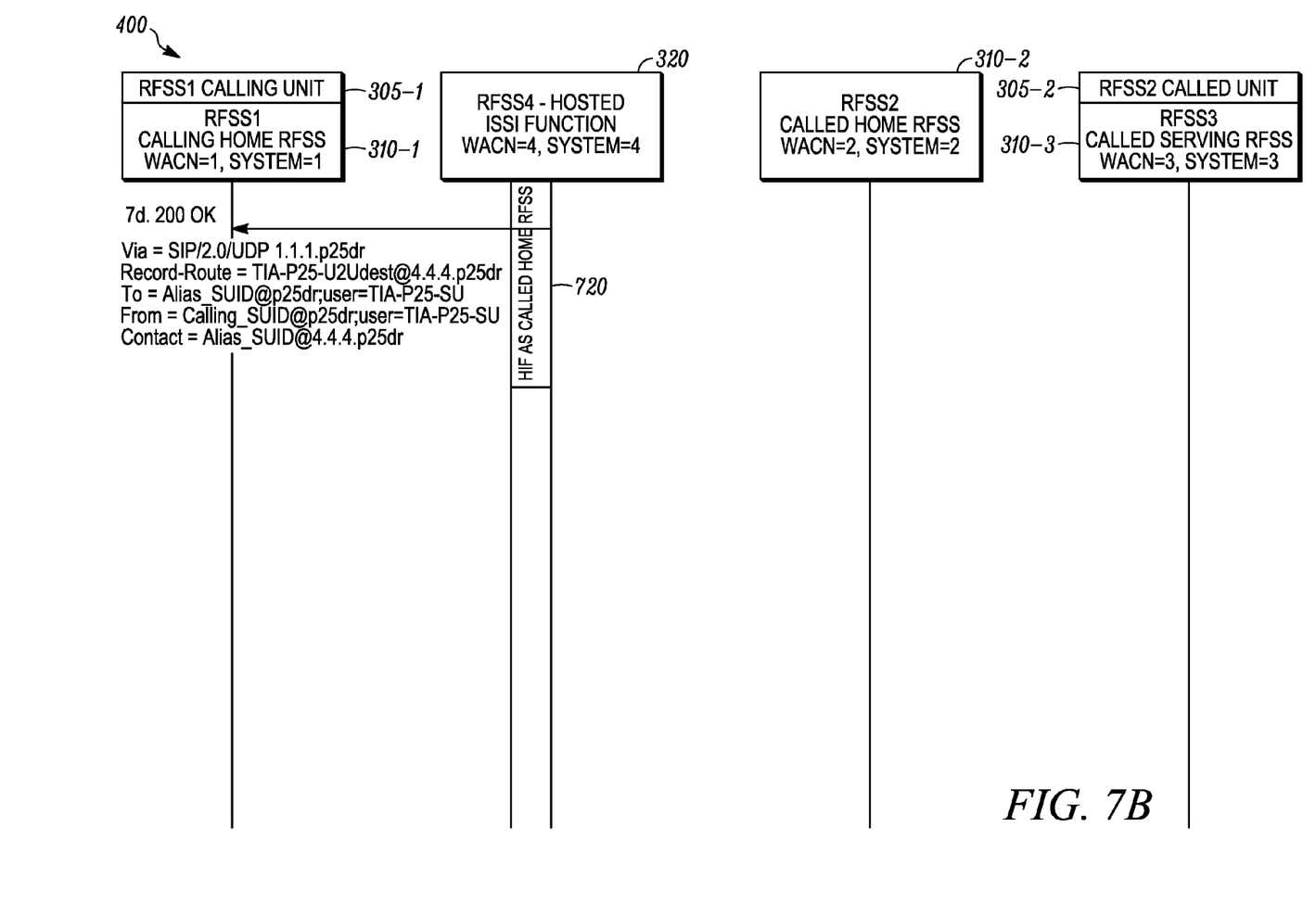

Referring to FIGS. 7A and 7B, a message sequence chart illustrates a continuation from FIG. 6B of the method 400. The RFSS3 310-3 may then transmit a 200 OK message 7a to the HIF 320. The HIF 320 may transmit a corresponding 200 OK message 7b to the RFSS2 310-2. The RFSS2 310-2 may transmit a corresponding 200 OK message 7c back to the HIF 320. Finally, the HIF 320 may transmit a corresponding 200 OK message 7d to the RFSS1 310-1. As shown by the blocks 705, 710, 715, 720, the HIF 320 again may act alternatively in the role of called home RFSS, calling home RFSS, called serving RFSS, and again as called home RFSS.

Figure 8A:
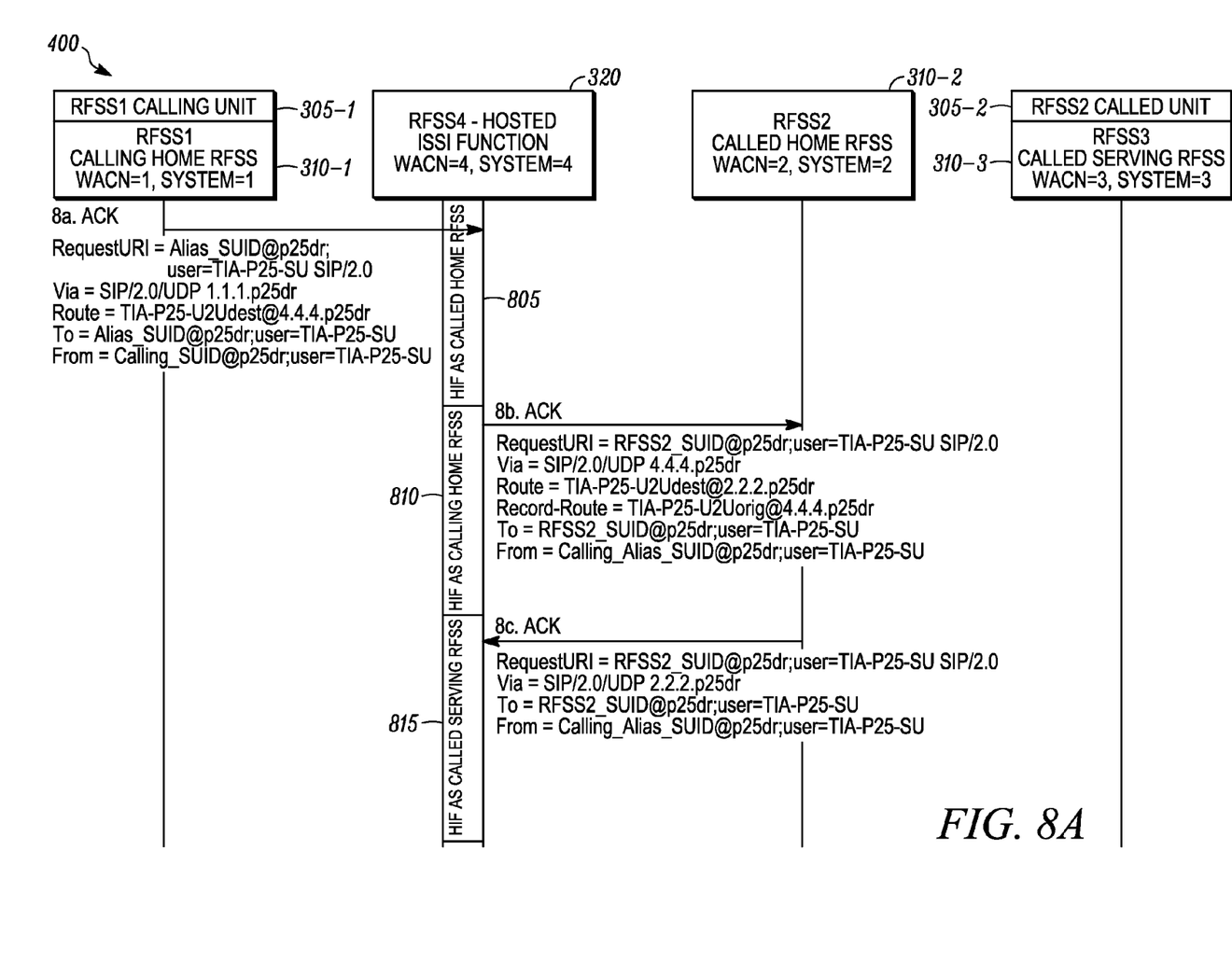
FIGS. 8A and 8B is a message sequence chart illustrating a continuation from FIG. 7B of the method for establishing an ISSI unit-to-unit call, including processing an acknowledgement from the calling unit.
Figure 8B:
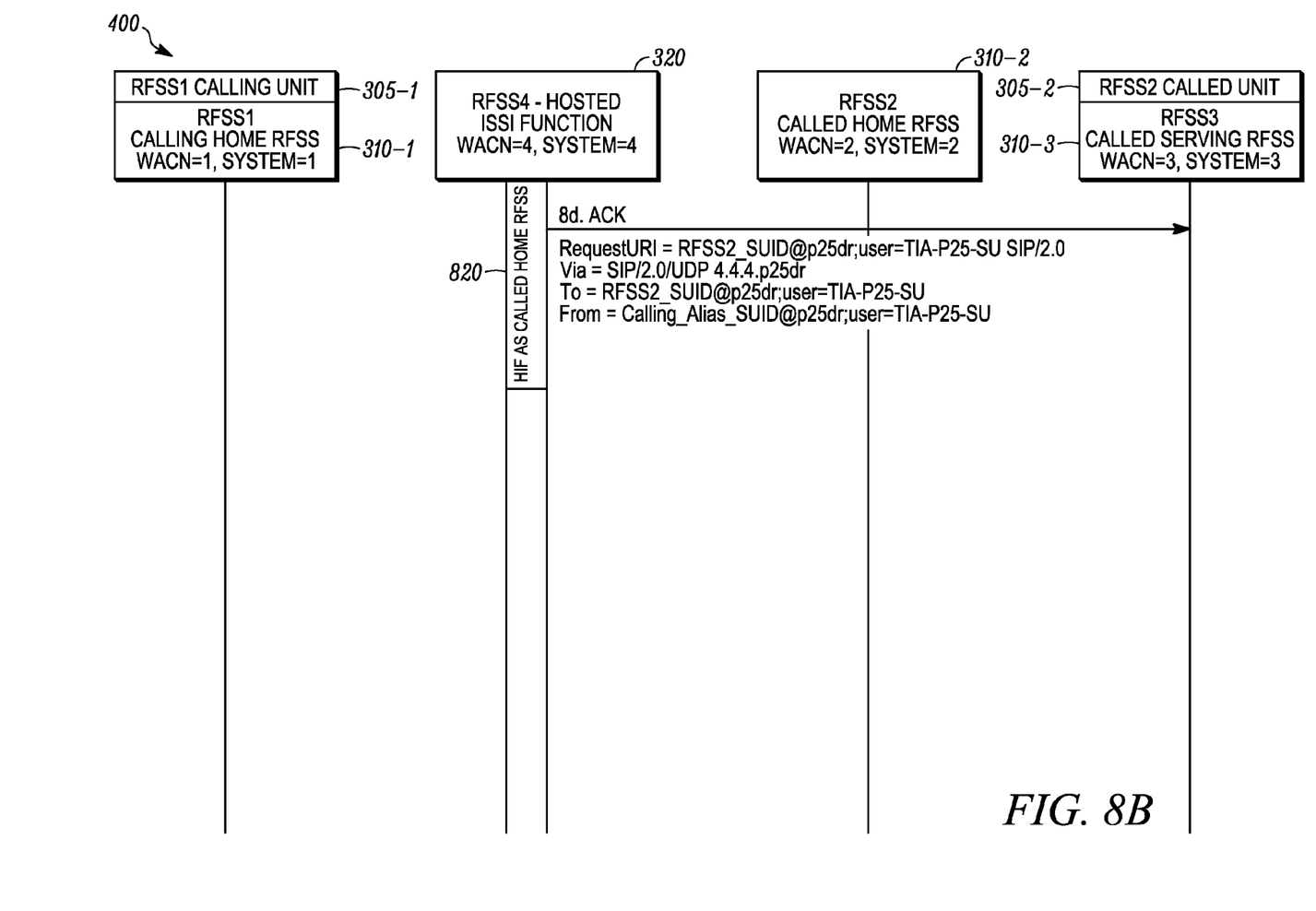

Referring to FIGS. 8A and 8B, a message sequence chart illustrates a continuation from FIG. 7B of the method 400. The RFSS1 310-1 may next transmit an acknowledgement (ACK) message 8a to the HIF 320. The HIF 320 may again retrieve the real called SU-ID (i.e. the RFSS2 310-2 SU-ID) from the previously stored mapping. The HIF 320 may then transmit a corresponding ACK message 8b to the RFSS2 310-2. The RFSS2 310-2 may then transmit a corresponding ACK message 8c back to the HIF 320. Finally, the HIF 320 may transmit a corresponding ACK message 8d to the RFSS3 310-3. As shown by the blocks 805, 810, 815, 820, the HIF 320 may again acts alternatively in the role of called home RFSS, calling home RFSS, called serving RFSS, and again as called home RFSS.

Figure 9:
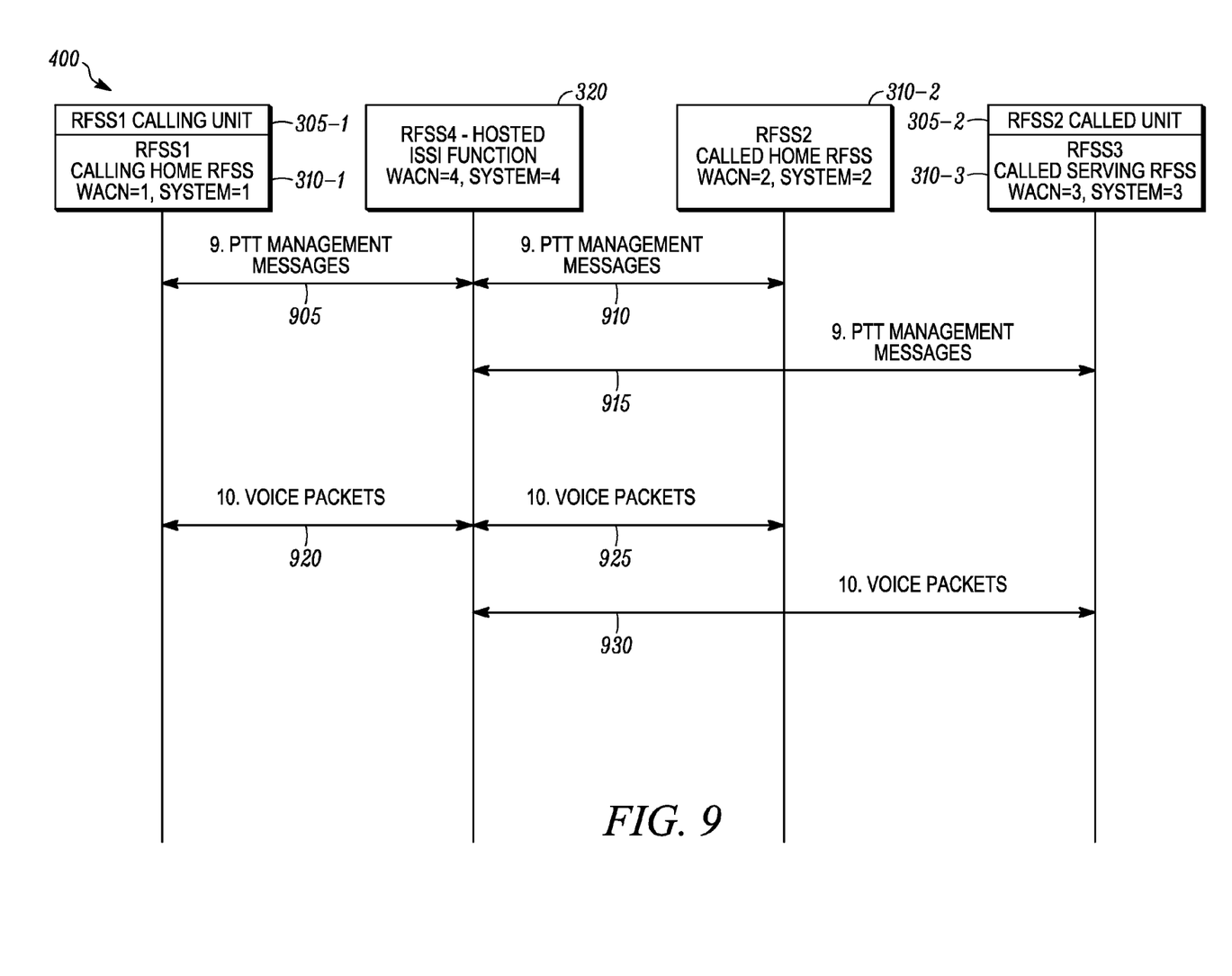
FIG. 9 is a message sequence chart illustrating a continuation from FIG. 8 of the method for establishing an ISSI unit-to-unit call, including processing PTT management messages and voice packets.

Referring to FIG. 9, a message sequence chart illustrates a continuation from FIG. 8B of the method 400. PTT management messages 905, 910, 915 from the RFSS1 305-1, RFSS2 310-2, and RFSS3 310-3 flow through the HIF 320 and may not be transmitted directly from one RFSS 310-n to another. For example, such PTT management messages may concern the following: requests by a serving RFSS for permission to transmit real time protocol (RTP) voice payload packets; queuing, granting or denying by a home RFSS of permission to transmit; initiation by a home RFSS of outbound talkspurts; propagation of voice by a home RFSS; management of losing audio by a given RFSS; termination of PTT transmission from a given RFSS; muting of undesired audio by a home or serving RFSS. Finally, voice packets 920, 920, 930 from the calling unit 305-1 and the called unit 305-2 may also flow through the HIF 320.

Figure 10:
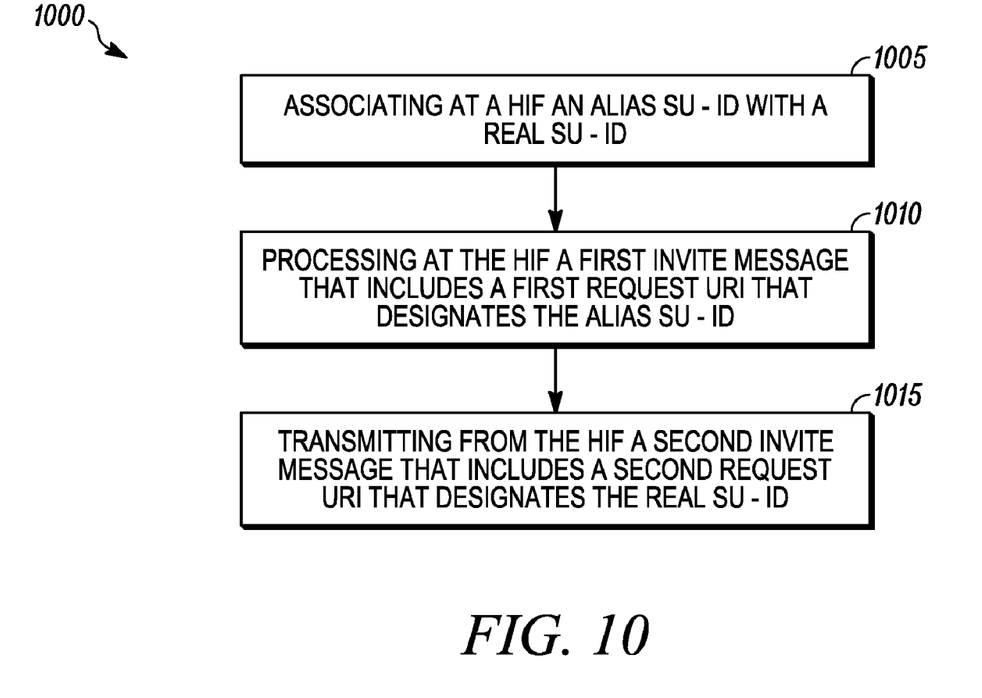
FIG. 10 is a general flow diagram illustrating a method for establishing an ISSI unit to-unit call through a HIF and between a home RFSS and at least one serving RFSS, according to an embodiment of the present disclosure.

Referring to FIG. 10, a general flow diagram illustrates an exemplary method 1000 for establishing an ISSI unit to unit call between a calling unit of a calling home RFSS and a called unit of a called home RFSS through a HIF, according to an embodiment of the present disclosure. At step 1005, the HIF may associate an alias SU-ID received from the called home RFSS with a real SU-ID, received from the called home RFSS, and designate the called unit. At step 1010, the HIF may process a first invite message, received from the calling home RFSS, including a first request URI that designates an alias SU-ID. At step 1015, the HIF may transmit to the called home RFSS from the HIF, in response to the first invite message, a second invite message including a second request URI that designates a real SU-ID. The unit-to-unit call is thereby established between the calling unit and the called unit through the calling home RFSS, the HIF, and the called home RFSS.

The method 1000 thus may describe various embodiments, including the embodiment illustrated in FIGS. 3-9, where the called unit is roaming and is associated with a called serving RFSS, and where the calling unit is not roaming. The method 1000 further describes other embodiments such as a) where the called unit is roaming and is associated with a called serving RFSS, and where the calling unit is roaming and is associated with a calling serving RFSS; and b) where the called unit is not roaming, and where the calling unit is roaming and is associated with a calling serving RFSS.

The techniques described in the present disclosure therefore can be applied to various types of unit-to-unit calls, such as the following: calling between two different home RFSSs without any roaming; calling between two different home RFSSs where only the calling unit is roaming; calling between two different home RFSSs where only the called unit is roaming; calling between two different home RFSSs where both units are roaming.

Figure 11:
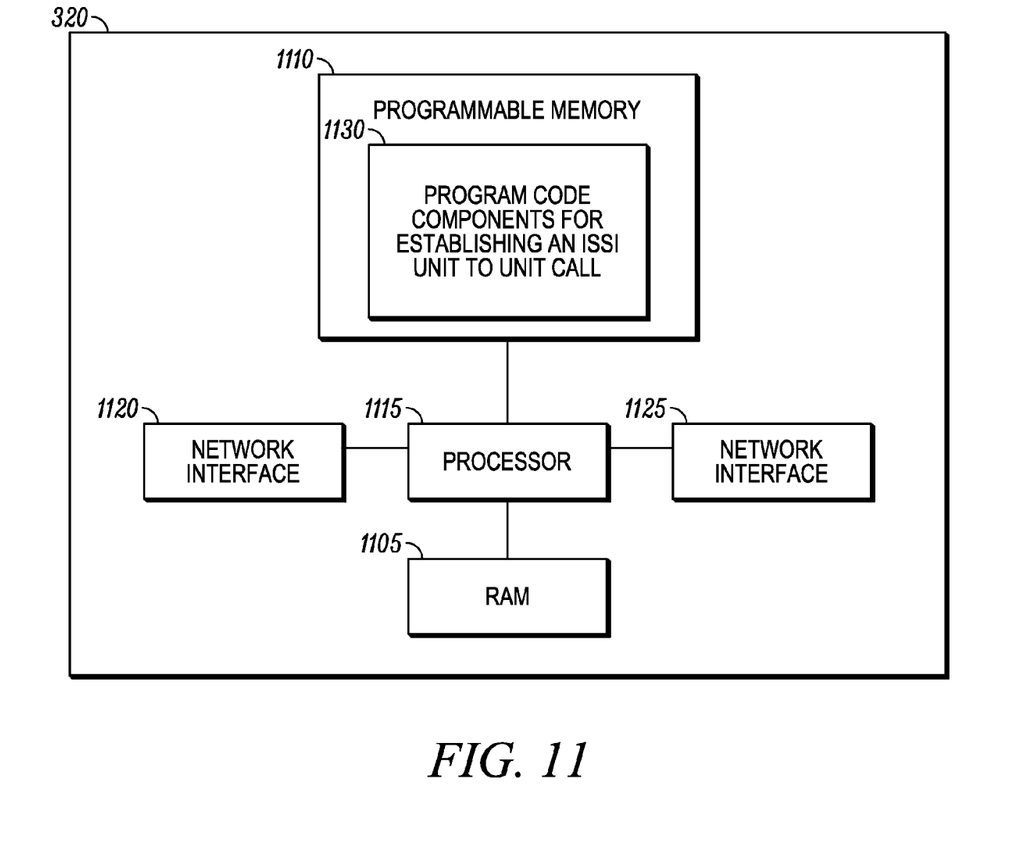

Referring to FIG. 11, a block diagram illustrates components of the HIF device, such as the HIF 320 described above, according to an embodiment of the present disclosure. The HIF 320, for example, may be included in various types of devices, including an integrated unit containing at least all the elements depicted in FIG. 11, as well as any other elements necessary for the HIF 320 to perform its particular functions. Alternatively, the HIF 320 may comprise a collection of appropriately interconnected units or devices, wherein such units or devices perform functions that are equivalent to the functions performed by the elements depicted in FIG. 11.

The HIF 320 may comprise a random access memory (RAM) 1105 and a programmable memory 1110 that are coupled to a processor 1115. The processor 1115 may also have ports for coupling to network interfaces 1120, 1125. The network interfaces 1120, 1125, which for example may be wired or wireless network interfaces, may be used to enable the HIF 320 to communicate with other network devices, such as other RFSS system modules such as the RFSS2 310-2, RFSS administrator modules, central advertisement service systems, and P25 radios.

The programmable memory 1110 may store operating code (OC) for the processor 1115 and code for performing functions associated with a HIF. For example, the programmable memory 1110 may store computer readable program code components 1130 configured to cause execution of a method, such as the method 1000, for establishing an ISSI unit to unit call between a calling unit of a calling home RFSS and a called unit of a called home RFSS through a HIF, as described herein.

Advantages of an embodiment of the present disclosure therefore include enabling an HIF, such as the HIF 320, to track a serving RFSS for all roaming subscriber radios or units, and to proxy all SIP signaling from a single RFSS to all other RFSSs in a network. Network security is also improved by the centralization of call management.

References to specific protocol messages (e.g. SIP messages) in the above figures are purely conceptual. The figures are not intended to be semantically correct; rather then are intended to illustrate how key data items are modified and used in the disclosure. Those having ordinary skill in the art will recognize that for purposes of brevity and clarity, the message sequence charts of this disclosure do not illustrate all aspects of the protocol, but only those aspects that are necessary to illustrate features of the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for establishing an inter-radio frequency subsystem interface (ISSI) unit-to-unit call between a calling unit of a calling home radio frequency subsystem (RFSS) and a called unit of a called home RFSS through a hosted ISSI function (HIF) device, the method comprising:
processing, at the HIF device, a first invite message received from the calling home RFSS, wherein the first invite message includes a first request uniform resource identifier (URI) that designates an alias system unit identification (SU-ID); and
in response to the first invite message, transmitting, from the HIF device to the called home RFSS, a second invite message, including a second request URI that designates a real SU-ID, wherein the HIF device acts as the calling home RFSS;
whereby the unit-to-unit call is established between the calling unit and the called unit through the calling home RFSS, the HIF device, and the called home RFSS.

2. The method of claim 1, further comprising associating, at the HIF device, the alias SU-ID with the real SU-ID designating the called unit.

3. The method of claim 2, wherein the called unit is roaming and is associated with a called serving RFSS, and wherein the calling unit is roaming and is associated with a calling serving RFSS.

4. The method of claim 1, wherein the called unit is not roaming, and wherein the calling unit is roaming and is associated with a calling serving RFSS.

5. The method of claim 1, wherein the called unit is roaming and is associated with a called serving RFSS, and wherein the calling unit is not roaming.

6. The method of claim 1, wherein the alias SU-ID and the real SU-ID are identical.

7. The method of claim 1, wherein the first and second invite messages are session initiation protocol (SIP) INVITE messages.

8. The method of claim 1, wherein the HIF device stores called unit registration information selected from the following: home RFSS transport information of the called unit; an identification of the called home RFSS; system identification; a wide area communications network (WACN) identification; and a subscriber unit identity.

9. The method of claim 1, wherein the HIF device functions as a session initiation protocol (SIP) back to back user agent.

10. The method of claim 1, wherein the HIF device processes push to talk (PTT) messaging between the calling unit and the called unit.

11. The method of claim 1, wherein voice data packets of the unit to unit call are routed through the HIF device.

12. A hosted inter-radio frequency subsystem interface function (HIF) device comprising:
a processor; and
a memory coupled to the processor, the memory including:
computer readable program code components for processing, at the HIF device, a first invite message, received from a calling home radio frequency subsystem (RFSS), including a first request uniform resource identifier (URI) that designates an alias system unit identification (SU-ID); and
computer readable program code components for, in response to the first invite message, transmitting from the HIF device to a called home RFSS, a second invite message, including a second request URI that designates a real SU-ID, wherein the HIF device acts as the calling home RFSS;
whereby a unit-to-unit call can be established between a calling unit and a called unit through the calling home RFSS, the HIF device, and the called home RFSS.

13. The device of claim 12, further comprising computer readable program code components for associating, at the HIF device, the alias SU-ID with the real SU-ID designating the called unit.

14. The device of claim 13, wherein the called unit is roaming and is associated with a called serving RFSS, and wherein the calling unit is roaming and is associated with a calling serving RFSS.

15. The device of claim 12, wherein the called unit is not roaming, and wherein the calling unit is roaming and is associated with a calling serving RFSS.

16. The device of claim 12, wherein the called unit is roaming and is associated with a called serving RFSS, and wherein the calling unit is not roaming.

17. The device of claim 12, wherein the alias SU-ID and the real SU-ID are identical.

18. The device of claim 12, wherein the first and second invite messages are session initiation protocol (SIP) INVITE messages.

19. The device of claim 12, wherein the HIF device stores called unit registration information selected from the following: home RFSS transport information of the called unit; an identification of the called home RFSS; system identification; a wide area communications network (WACN) identification; and a subscriber unit identity.

20. The device of claim 12, wherein the HIF device processes push to talk (PTT) messaging between the calling unit and the called unit.

* * * * *